United States Patent
Jones et al.

(10) Patent No.: US 8,176,214 B2
(45) Date of Patent: May 8, 2012

(54) TRANSMISSION OF ALTERNATIVE CONTENT OVER STANDARD DEVICE CONNECTORS

(75) Inventors: Graeme Peter Jones, Tampa, FL (US);
Daeyun Shim, Saratoga, CA (US);
Shrikant Ranade, Campbell, CA (US);
Gyadong Kim, Sunnyvale, CA (US);
Ook Kim, Palo Alto, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 94 days.

(21) Appl. No.: 12/606,096

(22) Filed: Oct. 26, 2009

(65) Prior Publication Data

US 2010/0109795 A1 May 6, 2010

Related U.S. Application Data

(60) Provisional application No. 61/110,326, filed on Oct. 31, 2008.

(51) Int. Cl.
*G06F 13/10* (2006.01)
(52) U.S. Cl. .............................. 710/14; 710/16; 710/62
(58) Field of Classification Search ........................ None
See application file for complete search history.

(56) References Cited

U.S. PATENT DOCUMENTS

| | | | |
|---|---|---|---|
| 2007/0286246 A1 | 12/2007 | Kobayashi | |
| 2008/0045049 A1* | 2/2008 | Collantes et al. | 439/76.1 |
| 2009/0108848 A1* | 4/2009 | Lundquist et al. | 324/538 |
| 2009/0128189 A1* | 5/2009 | Madurawe et al. | 326/41 |
| 2009/0177818 A1 | 7/2009 | Shim et al. | |
| 2009/0177820 A1 | 7/2009 | Ranade et al. | |
| 2009/0239559 A1* | 9/2009 | Hollis | 455/500 |
| 2010/0312933 A1* | 12/2010 | Chou et al. | 710/106 |

FOREIGN PATENT DOCUMENTS

WO WO-2009118582 10/2009

OTHER PUBLICATIONS

Silicon Image, "VastLane Mobile HD Link Transmitter", May 14, 2008, Sil9224 Product Brief, Silicon Image Inc., [retrieved on Apr. 23, 2010], retrieved from the internet:<URL: http://www.siliconimage.com/docs/Sil9224_pb_FINAL_5-14-08.pdf>, pp. 1-2.*
International Preliminary Report on Patentability for International Application No. PCT/US2009/062232 mailed May 12, 2011.
*Silicon Image VastLane Mobile HD Link Transmitter, Sil9224 Product Brief, Silicon Image, Inc.*, Sunnyvale, CA, May 2008, 2 pages.
International Search Report and Written Opinion of the International Searching Authority for International App. No. PCT/US2009/062232 mailed May 12, 2010, 15 pages.
Hitachi Ltd. et al., "High-Definition Multimedia Interface: Specification Version 1.3", *HDMI Licensing, LLC*, Jun. 22, 2006, pp. 1-237.
International Search Report and Written Opinion for International Patent Application No. PCT/US2009/062232, Mailed May 12, 2011, 8 pages.

\* cited by examiner

*Primary Examiner* — Ilwoo Park
(74) *Attorney, Agent, or Firm* — Blakely Sokoloff Taylor Zafman LLP (57) ABSTRACT

Transmission of alternative content over standard device connectors. An embodiment of a method includes connecting a first device to a second device utilizing a standard connector, the connector including multiple pins, and detecting whether the second device is operating in a standard mode or an alternative mode. If the second device is operating in the alternative mode, then switching one or more pins of the standard connector for the alternative mode and transmitting or receiving signals for the alternative mode via the plurality of pins of the standard connector.

34 Claims, 11 Drawing Sheets

TRANSMISSION OF ALTERNATIVE CONTENT OVER STANDARD DEVICE CONNECTORS

RELATED APPLICATION

This patent application is related to and claims priority to U.S. provisional patent application No. 61/110,326, filed Oct. 31, 2008.

TECHNICAL FIELD

Embodiments of the invention generally relate to the field of electronic devices and, more particularly, to a method and apparatus for transmission of alternative content over standard device connectors.

BACKGROUND

Increasingly diverse devices are utilized for data functions such as video and audio storage, transmission, and presentation or rendering. In one example, the HDMI™ (High-Definition Multimedia Interface) provides an interface that allows for the transfer of uncompressed digital high-definition video and audio, together with associated control signals. (HDMI is a trademark of HDMI Licensing, LLC) HDMI includes the High-Definition Multimedia Interface 1.3 (Hitachi, Ltd., Matsushita Electric Industrial Co., Ltd., Philips Consumer Electronics, International B.V., Silicon Image, Inc., Sony Corporation, Thomson Inc., and Toshiba Corporation) (Jun. 22, 2006), as well as earlier and later versions of HDMI. HDMI is backward and forward compatible with DVI (Digital Video Interface), which contains only video data. HDMI is essentially a superset of DVI, containing the same video content with the addition of multi-channel audio and status data content in the gaps, or blanking periods, between bursts of video data. Further, MHL™ (Mobile High-Definition Link™) provides an audio/video interface to connect portable electronic device to other devices, allowing for transfer of HDMI information utilizing connectors with fewer pins through the multiplexing of data multiple data signals, combining three lanes of HDMI data to a single lane of multiplexed data without requiring a separate clock. A handheld MHL device may, for example, allow for direct connection with a presentation or rendering device, including, for example, a television set, video monitor, or projector. Protocols for communication elements may include MHL technology.

Devices used in conjunction with content storage, transmission, and presentation may include any devices capable of providing, storing, or presenting multimedia data, including television sets, video monitors, projectors, cable and satellite set-top boxes, video players, including DVD (Digital Versatile Disk) and Blu-Ray players, audio players, digital video recorders, smartphones, MIDs (Mobile Internet Devices), PIDs (Personal Internet Devices), computers including notebook computers and netbooks, and other similar devices. HDMI and MHL devices utilize TMDS™ (Transition Minimized Differential Signaling) technology. TMDS encoding converts 8 bits per TMDS data channel into a 10-bit DC-balanced, transition minimized sequence, which is then transmitted serially across the pair at a rate of 10 bits per TMDS clock period. An HDMI connection may include a DDC (Display Data Channel) for configuration and status exchange between a source device and a sink device, and an optional CEC (Consumer Electronics Control) protocol to provide high-level control functions among audiovisual products in a user's environment, and an MHL connection may include a control bus carrying multiplexed control signals.

Electronic devices may include various different interfaces for the transfer of data, but smaller devices may be limited with regard to connections because of physical size. For example, certain handheld and other smaller devices may utilize a micro-USB™ (Universal Serial Bus), mini-USB, or standard USB connector (or socket) compatible with USB protocol, or similar connectors having limited space. The limited types of connections that are available may complicate high definition data transmission.

BRIEF DESCRIPTION OF THE DRAWINGS

Embodiments of the invention are illustrated by way of example, and not by way of limitation, in the figures of the accompanying drawings in which like reference numerals refer to similar elements.

SUMMARY

Embodiments of the invention are generally directed to a transmission of alternative content over standard device connectors.

In a first aspect of the invention, a method includes connecting a first device to a second device utilizing a standard connector, the connector including multiple pins, and detecting whether the second device is operating in a standard mode or an alternative mode. If the second device is operating in the alternative mode, then switching one or more pins of the standard connector for the alternative mode and transmitting or receiving signals for the alternative mode via the plurality of pins of the standard connector.

In a second aspect of the invention, an apparatus include an interface for a standard connector, wherein the apparatus is to utilize the interface for multiple lines, and wherein the apparatus is to detect a transmission mode of operation for a second apparatus connected to the apparatus via the interface. The apparatus further includes a switch to switch the interface between transmission modes, the modes including a first mode and a second mode, the switch to switch one or more connections for the lines to support the first mode and the second mode, and the apparatus to automatically switch to the second mode if the second mode is detected for the second apparatus.

DETAILED DESCRIPTION

Embodiments of the invention are generally directed to transmission of alternative content over standard device connectors.

As used herein:

"Mobile device" means any mobile electronic device. The term "mobile device" includes, but is not limited to, a cellular telephone, smartphone, PDA (personal digital device), MP3 or other format music player, digital camera, video recorder, digital storage device, and other similar devices.

In some embodiments, an apparatus, system, or method provides for transmission of alternative content over existing connectors, such as, for example, transmission of high-definition video and audio content over existing connections. In some embodiments, a system or method provides for multiple modes to provide for connection for both conventional data and alternative serial data. In some embodiments, a system provides for re-purposing of existing connections or pins to allow for transmission of alternative content. (In this description, connection elements may be referred to as connectors or as sockets into which connectors may be fitted, but it is intended that the terms may be interchangeable and that either term describes a general connection element for an apparatus.)

In a particular embodiment, alternative data transferred between devices may be multimedia data and associated commands, including HDMI data and commands. For example, a mobile device containing high-definition video and audio data and related commands may be connected to a standard HDMI device (such as, for example, a television set, video monitor, projector, or other data presentation device). However, embodiments of the invention are not limited to any particular type of data or device.

In some embodiments, a device is a mobile device utilizing an MHL data connection. While embodiments of the invention are not limited to any particular technology, MHL may utilize a 5 or 6 pin interface that carries audio, video, and auxiliary data between a source and a sink. In some embodiments, the MHL data may be transmitted via a standard or conventional connector by remapping the data signals to the standard connector. In some embodiments, power and/or battery charging current may be provided to a mobile device (via a VBUS line) from a presentation or rendering device that is linked to the mobile device via an MHL cable. In some embodiments, a standard connector may be a micro-USB (Universal Serial Bus) connector, but embodiments are not limited to any particular connector, and may also include, for example, a standard USB or mini-USB connection compatible with USB protocol or a headphone connector.

In some embodiments, a system or method is provided to transmit serialized HD (high-definition) video and audio content over an existing micro-USB connector. However, in other embodiments a method may be applied to a mini-USB or standard USB connector, a headphone connector, or to another type of connection. In some embodiments serialized HD content may be digital audio and/or digital video, such as HDMI (providing video and audio data) or DVI (containing only video), Ethernet, SATA (Serial Advanced Technology Attachment), PCI (Peripheral Component Interface)-express, or high speed lane of USB 3.0.

A micro-USB connector has 5 lines: VBUS or VCC (voltage of +5V), a differential pair D− and D+ (data+ and −), ID (to distinguish between micro-USB Types A and B connectors, with pin tied to ground for Micro-A connector and not connected for Micro-B), and GND (signal ground)/Shell). In some embodiments, the micro-USB connector is utilized for sending multiple lanes of alternative data, such as serialized HD contents. In some embodiments, power and/or battery charging current is also received via the VBUS from a presentation or rendering device that is linked to the connector. A mini-USB connector also includes 5 lines, and may be similarly utilized for transmission of alternative data. A standard USB connector includes 4 lines, and in some embodiments the lines may be multiplexed to provide for re-purposing of the USB connector for transmission of alternative data.

In some embodiments, an apparatus or system may detect the type of connection, and switch to a mode for the detected type of connection, such as a selection between a high definition mode, a USB mode, and any other modes of transmission. In some embodiments, the detection process is automatic. However, embodiments of the invention are not limited to any particular types or number of transmission modes.

Figure 1:
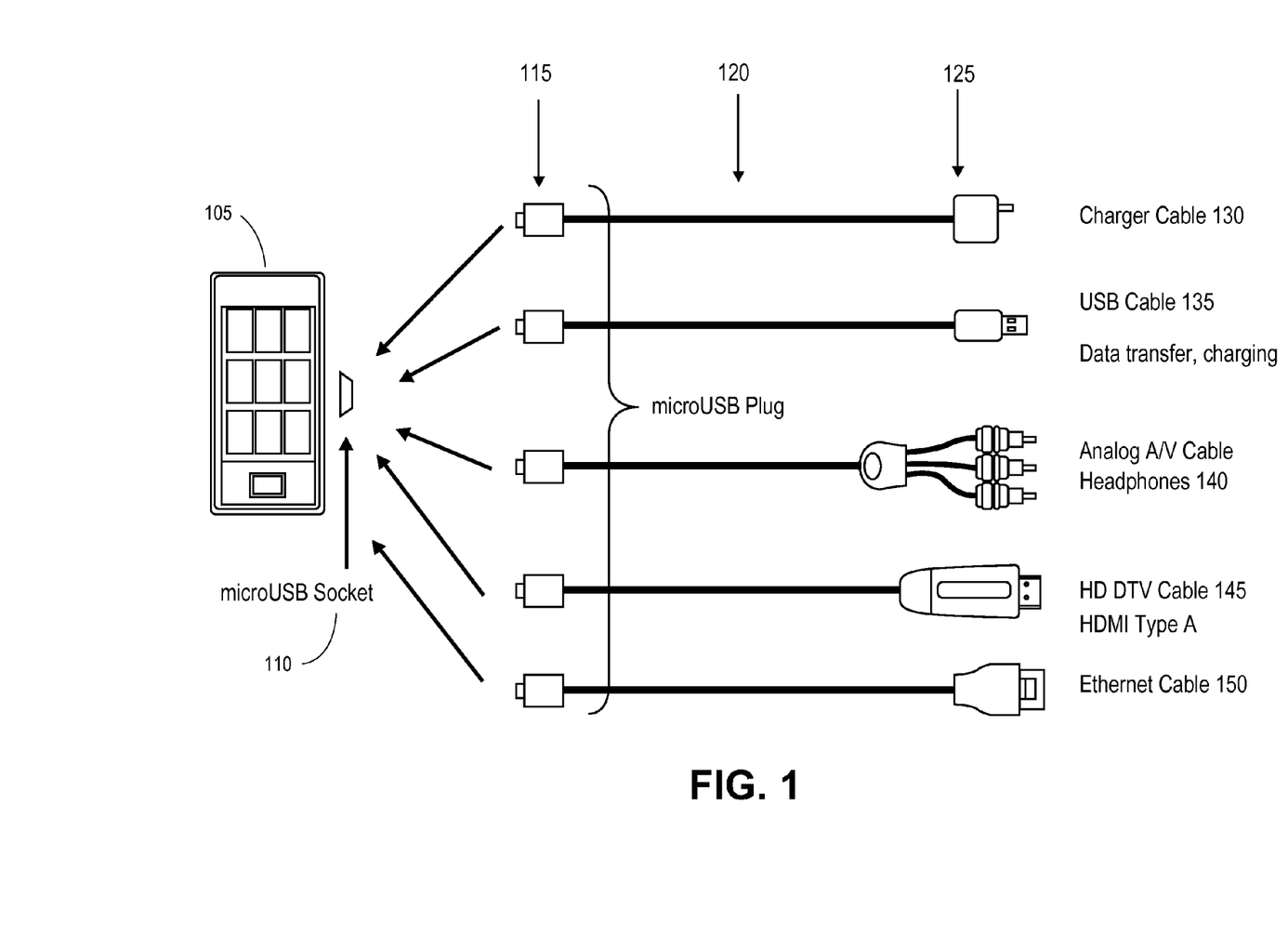
FIG. 1 is an illustration of an embodiment of possible connections to a standard connector.

FIG. 1 is an illustration of an embodiment of possible connections to a standard connector. In this illustration, a handheld device 105 may include a micro-USB socket 110 that is utilized for multiple purposes by switching to different transmission modes, and reassigning the pins of the socket 110 as needed to support the transmission modes. In this illustration, in each mode a device will utilize a cable having a first micro-USB connector 115 for connection with the micro-USB socket of the handheld device 105, but with a cable section 120 and second connector 125 that are compatible with another type of data transmission.

For example, the connections may include, but are not limited to, a charger cable 130 to provide power to the handheld device 105; a standard USB cable for data transfer and device charging 135; an analog A/V (audio/video) cable or headphone connection 140; a high definition digital television cable, such as HDMI type-A, for connection with an HDMI compatible device 145; or an Ethernet cable for connection to a high speed data link 150. In some embodiments, the handheld device 105 may detect the type of connection when the device is connected via the micro-USB socket 110, and may automatically switch to the appropriate mode to support the connection.

Figure 2:
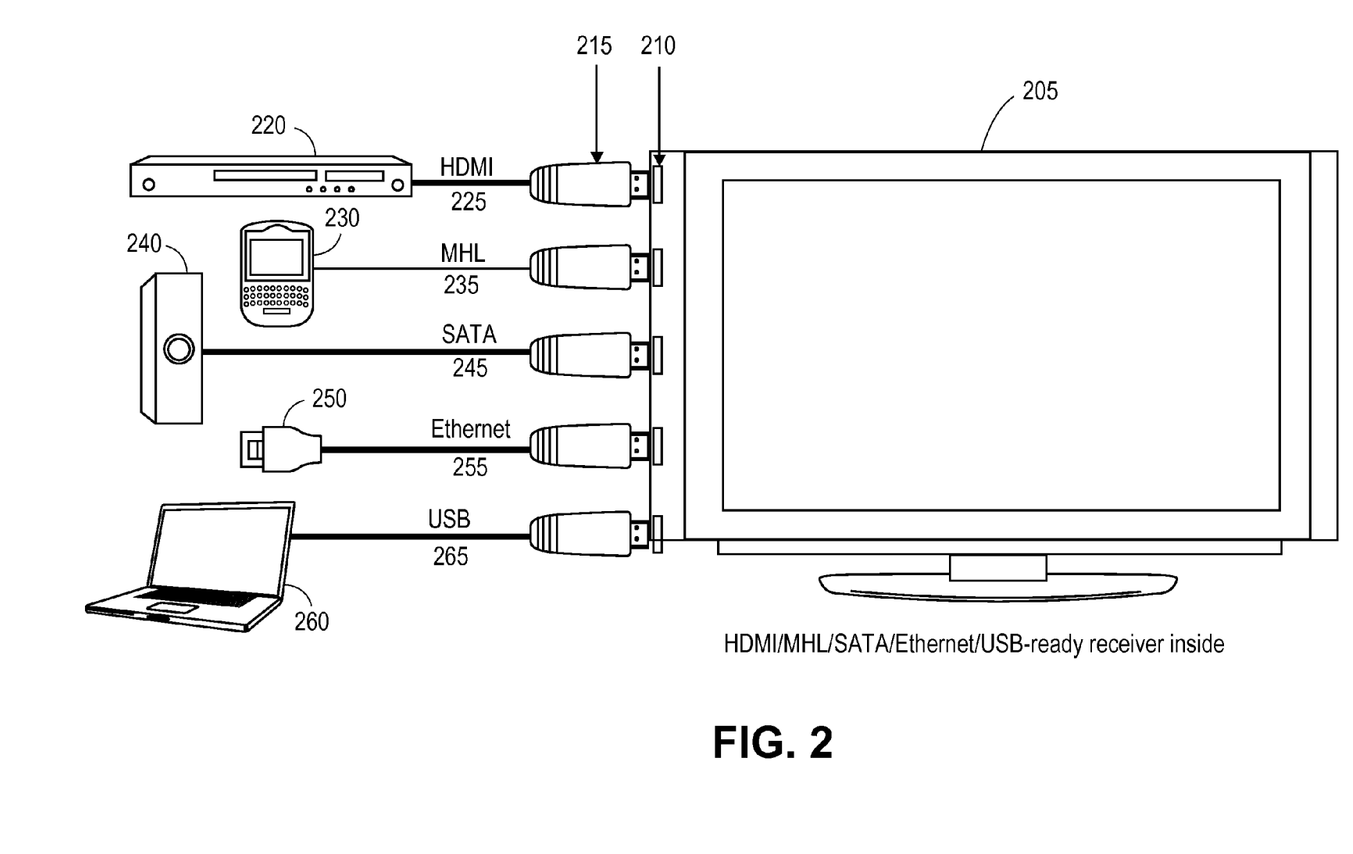
FIG. 2 is an illustration of an embodiment of a connection for a receiving device having a standard connector.

FIG. 2 is an illustration of an embodiment of a connection for a receiving device having a standard connector. In some embodiments, in addition to a transmitting device utilizing a standard connector to support multiple types of connections with other devices, a receiving device may utilize a standard connector for multiple connections with other devices.

In this illustration, a television set, video monitor, or other presentation device 205 may include one or more standard connector sockets 210, such as HDMI compatible sockets, to accept connectors 215 (such as HDMI compatible connectors) to provide multiple types of connections. In this illustration, the presentation device 205 includes a receiver that is ready to accept data via multiple protocols, including, as illustrated in FIG. 2, HDMI, MHL, SATA™ (Serial ATA), Ethernet, and USB.

In some implementations, the presentation device 210 may provide support for: An HDMI source device 220, such as video recorder, Blu-Ray or DVD player, set-top box, or other device via an HDMI compatible cable 225; a mobile high definition device 230, such as a smartphone or other similar device, via an MHL cable 235; a SATA compatible storage device 240 via a SATA compatible cable 245; an Ethernet network connection via an Ethernet compatible cable 255 and including an Ethernet connector 250 for link with a network; or a device including a USB connection 260, such as a computer (including a laptop or netbook computer), via a USB compatible cable 265. In some embodiments, devices such as the illustrated devices may be coupled at random with any of the sockets 210. In some embodiments, the presentation device 205 may, without concern to a signal format that is attached, detect a type of link that is connected with any HDMI socket, and may dynamically switch to a mode that is compatible with the link, wherein the mode switch includes remapping and re-purposing the pins of the socket to support the attached link. In some embodiments, the presentation device 205 thus may utilize multiple HDMI compatible sockets to support any connection that is required for the presentation device 205, thus simplifying the physical connections required for the device. In some embodiments, the presentation device 205 may then operate as a central hub for a home entertainment network that includes multiple devices utilizing varying protocols for communication.

Figure 3:
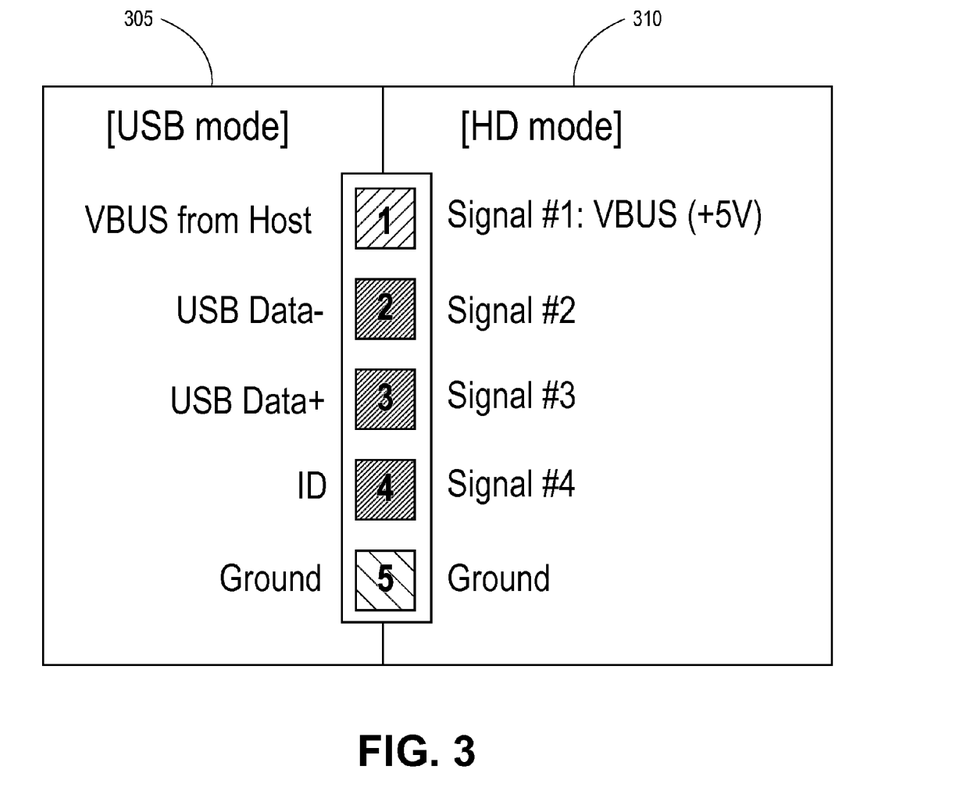
FIG. 3 illustrates an embodiment of mapping of high definition data for a micro-USB connector.

FIG. 3 illustrates an embodiment of mapping of high definition data for a micro-USB connector. In this illustration, a micro-USB connector or other connector may be utilized in two modes, with a first mode being a standard-mode, or specifically a USB mode in this illustration 305, and a high definition mode (or HD-mode, which may in one example be a micro-MHL mode) for alternative serial content, such as high definition MHL data 310. However, embodiments of the invention are not limited to these particular modes, or to any particular number of modes. As illustrated, the USB-mode 305 maintains USB connections VBUS (which may provide power and/or battery charging current for a device), Data−, Data+, ID, and ground. For HD-mode, Signal #1 and a VBUS voltage are mapped to VBUS, Signal #2 to Data−, Signal #3 to Data+, Signal #4 to ID, and Ground to Ground.

Figure 4:
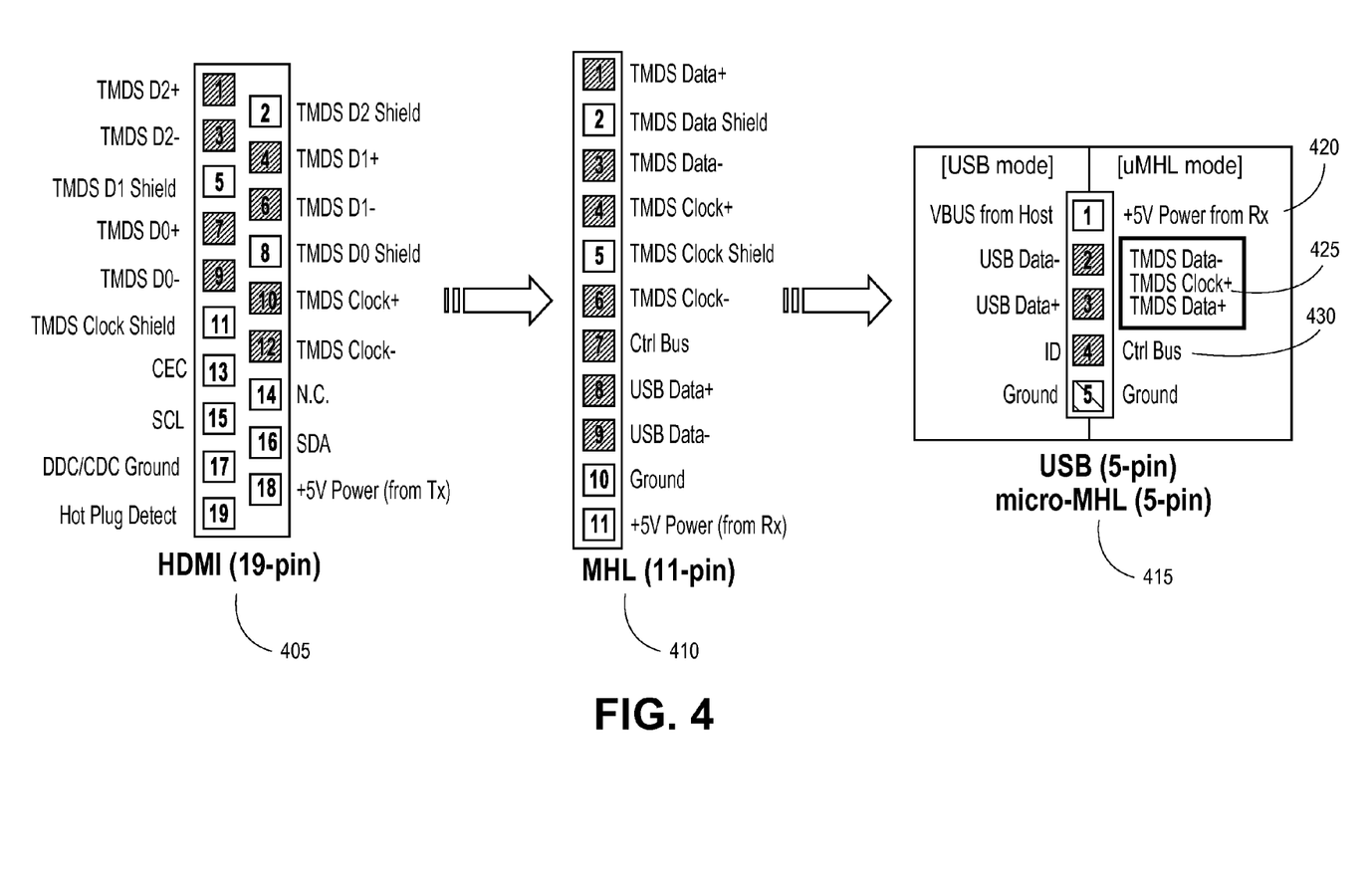
FIG. 4 illustrates an embodiment of data mapping between HDMI, MHL, and micro-USB/MHL.

FIG. 4 illustrates an embodiment of data mapping between HDMI, MHL, and micro-USB/MHL. As illustrated, an HDMI connector 405 compatible with HDMI protocol contains nineteen pins, including three differential data signals (TMDS D0+ and TMDS D0−, TMDS D1+ and TMDS D1−, and TMDS D2+ and TMDS D2−). An MHL connector 410 compatible with MHL protocol provides for the combination of the multiple data lanes to a single data lane TMDS (Data+ and Data−). A micro-USB connector 415 then provides for the two-mode operation for a USB-mode and a micro-MHL mode. The MHL signal, which provides a single-lane HDMI with Data, Clock, and CBUS lanes, is mapped to micro-USB by limiting the CBUS to one pin and utilizing two pins to transmit one-lane of data using differential signaling. In this illustration, the micro-MHL mode may be mapped such that Signal #1 is +5V from the receiver 420 (which may be utilized to provide power and/or battery charging current for a mobile device), Signal #2 and Signal #3 are utilized for TMDS Data−, TMDS Clock+, and TMDS Data+ 425, and Signal #4 is the control bus 430. In some embodiments, the VBUS (voltage or power bus) and Ground are not modified in the micro-USB interface. The D− and D+ lines of USB may be utilized for sending a single lane of data as differential signaling. In some embodiments, the CLK may be utilized to transmit an additional lane of traffic data using common-mode signaling.

In some embodiments, a high-definition mode is utilized to send alternative serial data over a standard socket or connector. In some embodiments, the socket or connector may be utilized to send one or more lanes of data in HD-mode. In some implementations, the HD-mode may be utilized to provide multiple differential lanes of data including use of a signal transmitted over a power line, thus using Signal #1 to transmit data in addition to the voltage provided. In some embodiments, common mode signaling may be utilized to provide additional data than would be provided utilizing differential signaling alone. For example, if common-mode signaling is applied, four pins (Signals #1-#4 in this example) may be utilized to support an additional two data lanes, with the common mode signal being modulated on top of the differential signal.

In some embodiments, one or more lanes of HD content are sent to pins of an existing connector, such as an existing 5-pin or 6-pin micro-USB connector, while retaining the capacity to provide the original signaling, such as retaining USB signaling in a modal approach. In some embodiments, the new signaling for the USB connector is supported by switching a mode, such as original USB signaling mode (USB-mode) to HD-mode. In USB-mode, the electrical and logic compliance for USB is preserved, while alternative data is provided in the HD-mode.

In some embodiments, a modal approach includes an analog-switch, analog-multiplexer, or similar device that is utilized to select between USB signals and HD signals. In some embodiments, the switching may be utilized to maintain compliance of a connection with a standard, such as maintaining USB compliance with the added new signaling. For example, in "HD-mode", a 5-pin (VBUS, D−, D+, ID, GND&Shield) or 6-pin (VBUS, D−, D+, ID, GND, Shield) interface may be used to send one lane or more of serialized signals over an existing micro-USB connector. However, embodiments are not limited to two modes, and the analog switch may, for example, allow for switching to one or more modes in addition to USB-mode and HD-mode.

In this specification, it is generally assumed for sake of explanation that a single data lane of HDMI data is provided as the main HD content. In some embodiments, the data is presented as MHL data, but HD contents are not limited to MHL. In an MHL implementation, an MHL clock lane is the same as a clock lane for HDMI, but 3 lanes of HDMI data are multiplexed to form a single lane of data, and DDC/CEC/HPD are sent over a single control bus (CBUS) signal line. However, complete details regarding the operation of HDMI and MHL are outside the scope of this description.

Figure 5:
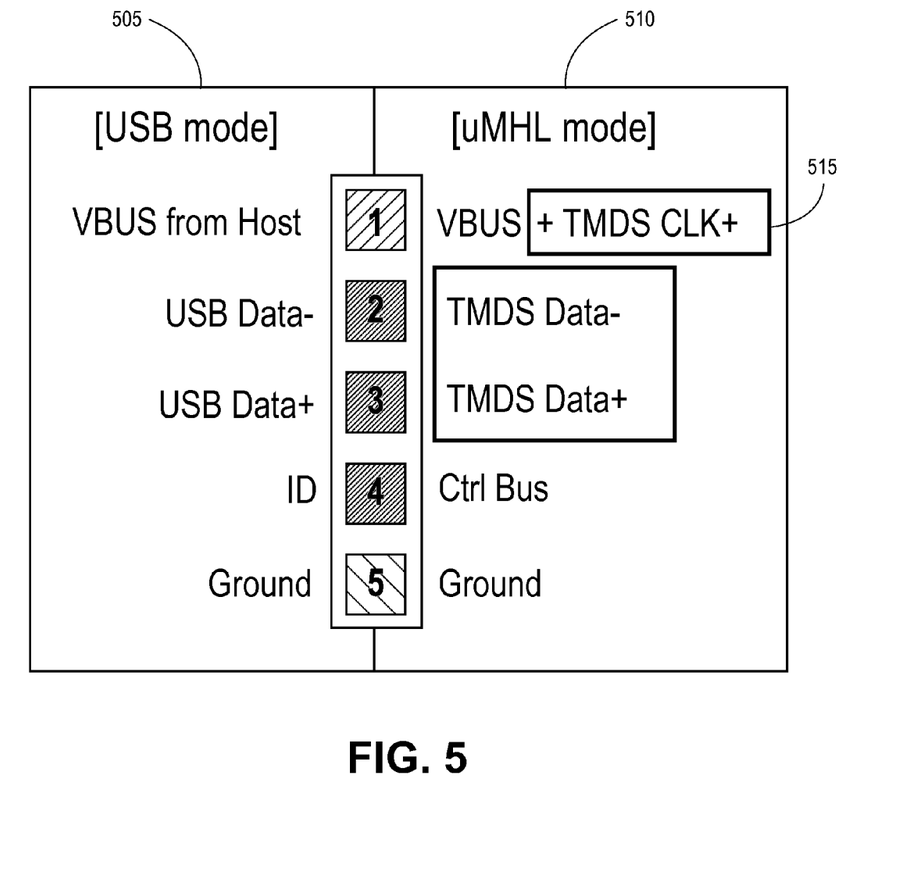
FIG. 5 is an illustration of an embodiment of mapping of signals utilizing a clock signal.

FIG. 5 is an illustration of an embodiment of mapping of signals including a clock signal. In this particular illustration, a device connection may support a USB mode 505 and a micro-MHL mode 510. In this implementation, the HD data lane (Data− and Data+) is mapped to USB Data− and Data+, and the control bus is mapped to USB ID. However, the clock signal, CLK 515, may be mapped to the VBUS lane using AC coupling, as shown in FIG. 5. In this manner, the VBUS is modulated to carry additional data in addition to providing a connection for power and/or battery charging current.

Figure 6:
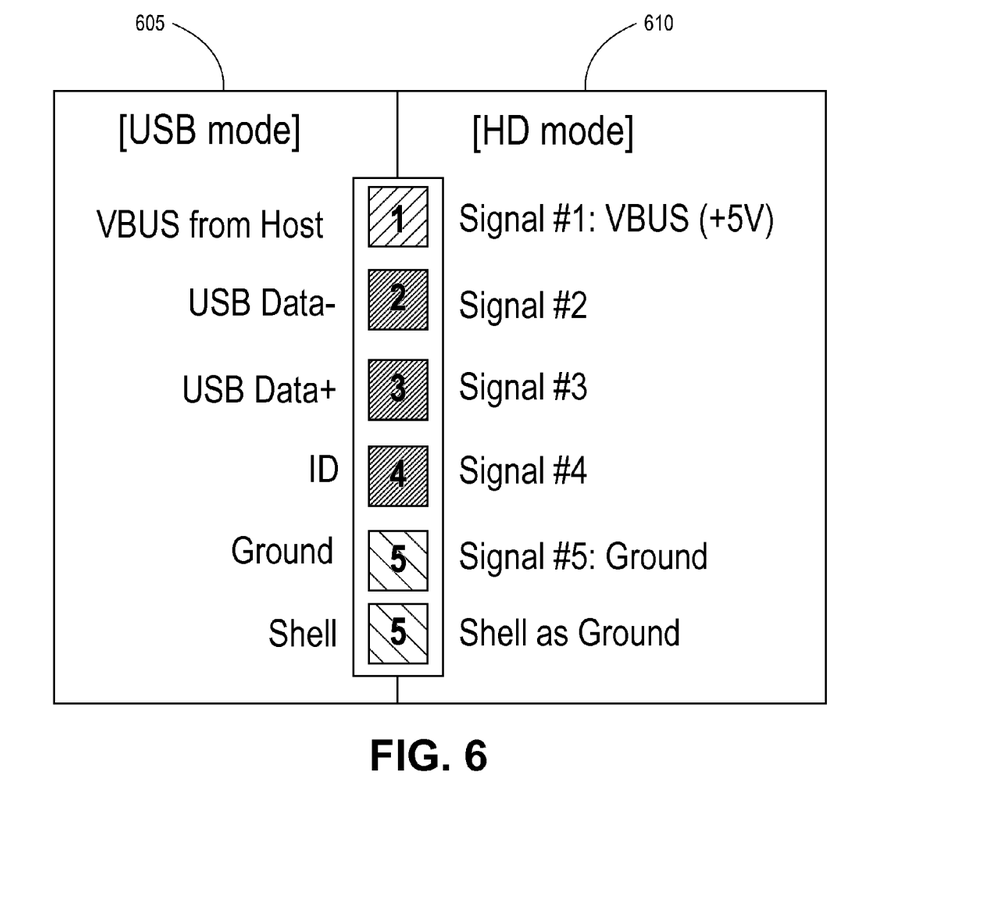
FIG. 6 is an illustration of an embodiment of a high definition mode and a USB mode for a connector including a separate shell.

FIG. 6 is an illustration of an embodiment of a high definition mode and a USB mode for a connector including a separate shell. In some embodiments, a USB connector may provide additional signals through utilization of the separate shell. In some embodiments, the utilization of the shell allows the addition of another pin for use in transmission of a signal in HD-mode. Because the shell has a larger capacitance than other connections, the shell may be better utilized as a ground signal than a signal line, but the utilization of the shell allows the ground-signal (pin #5 in FIG. 6) to be used as another signal for HD-mode. In this illustration, a micro-USB connector may be utilized in two modes, with a first mode being a standard-mode, or specifically a USB mode in this illustration 605, and an HD-mode 610 for alternative serial content, such as high definition MHL data. As illustrated, the USB-mode 605 maintains USB connections VBUS, Data−, Data+, ID, ground, and Shell. For HD-mode, Signal #1 and a VBUS voltage are mapped to VBUS, Signal #2 to Data−, Signal #3 to Data+, Signal #4 to ID, a Signal #5/Ground to USB Ground, and the Shell to Ground.

In some embodiments, the use of the Shell as Ground and the Ground as Signal #5 may provide an additional pin for signal transmission. In some embodiments, because of the additional pin or signal available for transmission, a system may utilize D−/D+ to provide one HD digital stream and ID/GND as provide, for example, another HD digital stream or CLK for MHL application. In an alternative embodiment, the control bus CBUS may be implemented using the common-mode of either D−/D+ or ID/GND.

Figure 7:
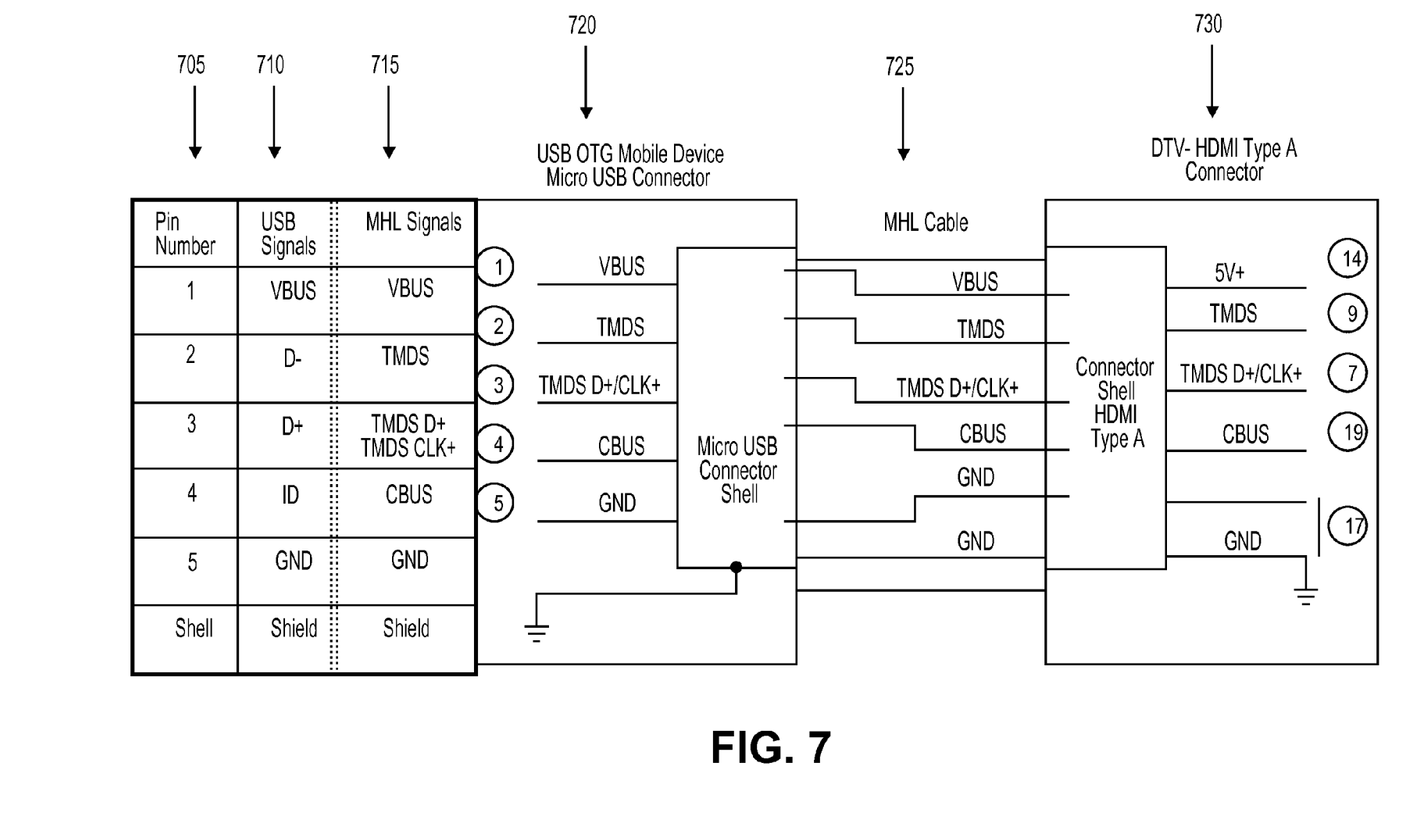
FIG. 7 is an illustration of an embodiment of a transfer of signals between a USB connection and an HDMI connection.

FIG. 7 is an illustration of an embodiment of a transfer of signals between a USB connection and an HDMI connection. In FIG. 7, the USB pins numbers 1-5 and shell 705, which are intended for USB signals VBUS, D−, D+, ID, GND, and Shield respectively 710, are re-purposed for MHL signals VBUS, TMDS−, TMDS+ and TMDS CLK+ (the clock being modulated as a common mode), CBUS, GDN, and Shield respectively 715. Thus, the USB pins on the mobile device are re-purposed for MHL, with the USB Data pins re-purposed for MHL TMDS data and clock and the USB ID pin re-purposed for the MHL CBUS. The MHL signals are applied to the pins of a USB OTG (On-The-Go) mobile device. The device is connected with a cable, the cable including a micro-USB connector 720, an MHL cable section 725, and an HDMI connector 730 for coupling with an HDMI socket. In this manner, the mobile device may be utilized to provide MHL data via a micro-USB (or other) connector to an HDMI device that is compatible to receive the MHL data.

Figure 8:
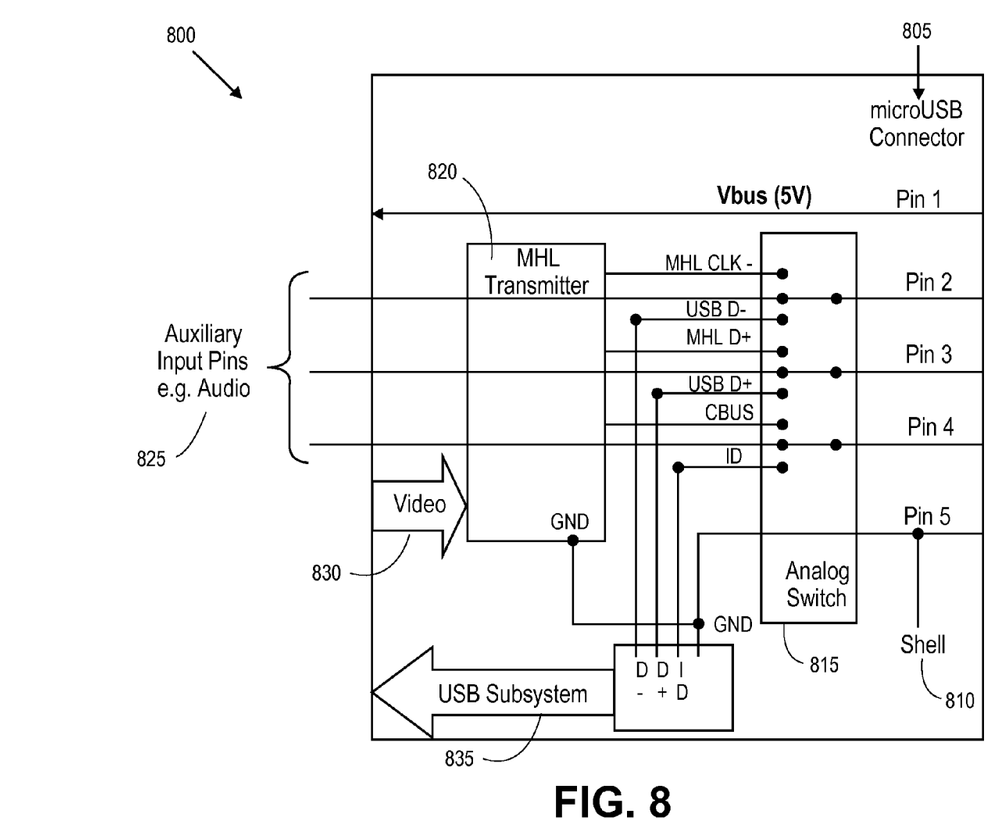
FIG. 8 is an illustration of an embodiment of a device having a switch to select a mode among multiple connection modes.

FIG. 8 is an illustration of an embodiment of a device having a switch to select a mode among multiple connection modes. In this illustration, a device 800 includes a micro-USB connector 805, which includes Pin 1, Pin 2, Pin 3, Pin 4, and Pin 5, together with a shell connection 810. In this example, Pin 1 may be utilized for a power connection, shown as VBUS (5V), and pin 5 and the shell connection may be tied to ground. Pins 2, 3, and 4 are subject to switching to support multiple modes of operation. In order to switch between modes, the device 800 includes an analog switch 815 to switch Pins 2, 3, and 4, and thus remap these connections for the micro-USB connector 805.

In this illustration, in a USB-mode the analog switch 815 is switched to connect Pin 2 to data D−, Pin 3 to data D+, and Pin 4 to ID, thereby supporting a connection with a USB subsystem 835. In some embodiments, the USB-mode may be a default mode for the analog switch 815. The device 800 may further include an MHL transmitter 820 to transmit high definition video and audio data 830. In an MHL-mode the analog switch 815 is switched to connect Pin 2 to MHL data− and clock (via a common mode), Pin 3 to MHL data+, and Pin 4 to a control bus. In some embodiments, the analog switch 815 may provide for switching to one or more other modes, including, for example, a connection of Pins 2, 3, and 4 to auxiliary inputs pins 825, which may be, for example, an audio input to the device 800.

Figure 9:
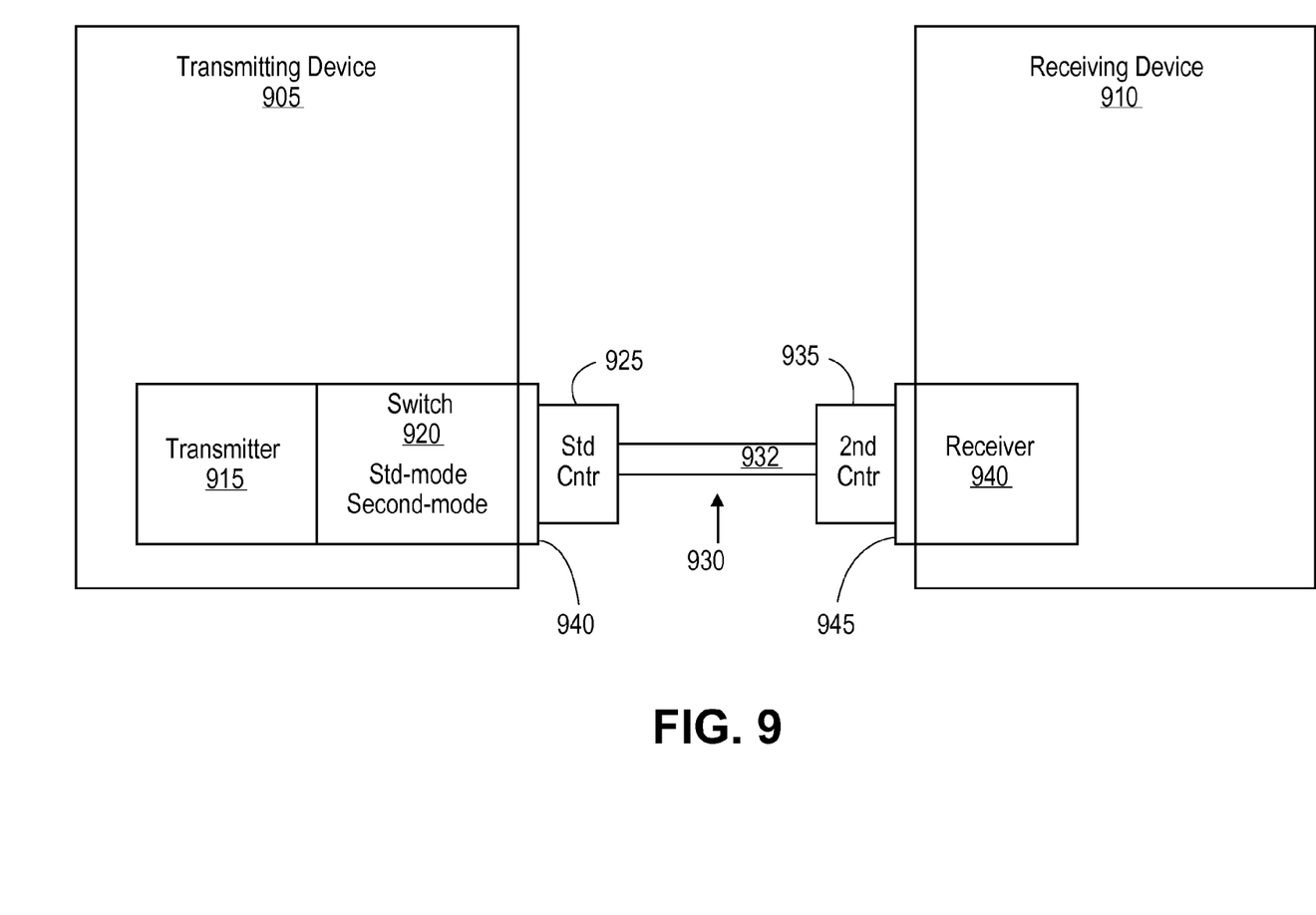
FIG. 9 is an illustration of an embodiment of a connection for a transmitting device transmitting data to a receiving device.

FIG. 9 is an illustration of an embodiment of a connection for a transmitting device transmitting data to a receiving device. In this illustration, the transmitting device 905, including a transmitter 915, and the receiving device 910, including a receiver 940, are connected together via a cable 930. The transmitting device 905 may be, for example, a handheld device, which may only have a single standard connection for data transmission, such as a micro-USB socket. The transmitter 915 may be, for example, an MHL transmitter, with the MHL transmitter to transmit MHL data via the single connection of the transmitting device 905. The transmitting device 905 further includes a switch 920 to switch between a standard-mode for transmission of standard data (such as USB data) and a second mode, which may include an HD-mode to transmit a plurality of signals related to the transfer of high definition video and audio content, such as MHL content. The transmitting device 905 includes a socket 940 for a standard connector, such as a micro-USB connector. The receiving device 910 may include a socket 945 for a connector, which may include, for example, a socket for USB connector or an MHL or HDMI connector. In this illustration, the transmitting device 905 and receiving device 910 are connected via the cable 930, the cable having a standard connector 925, such as a micro-USB connector, for connection with the transmitting device 905 and a cable section 932 and second connector 935 compatible with the communication protocol for the receiving device 910. In this illustration, the communication protocol may be USB or MHL. In some embodiments, the transmitting device 905 will detect the relevant communication type when the transmitting device 905 is connected to the receiving device 910 via the cable 930, and the switch 920 will switch to the appropriate mode to map the pins of the socket 940 as required for signal transmission.

Figure 10:
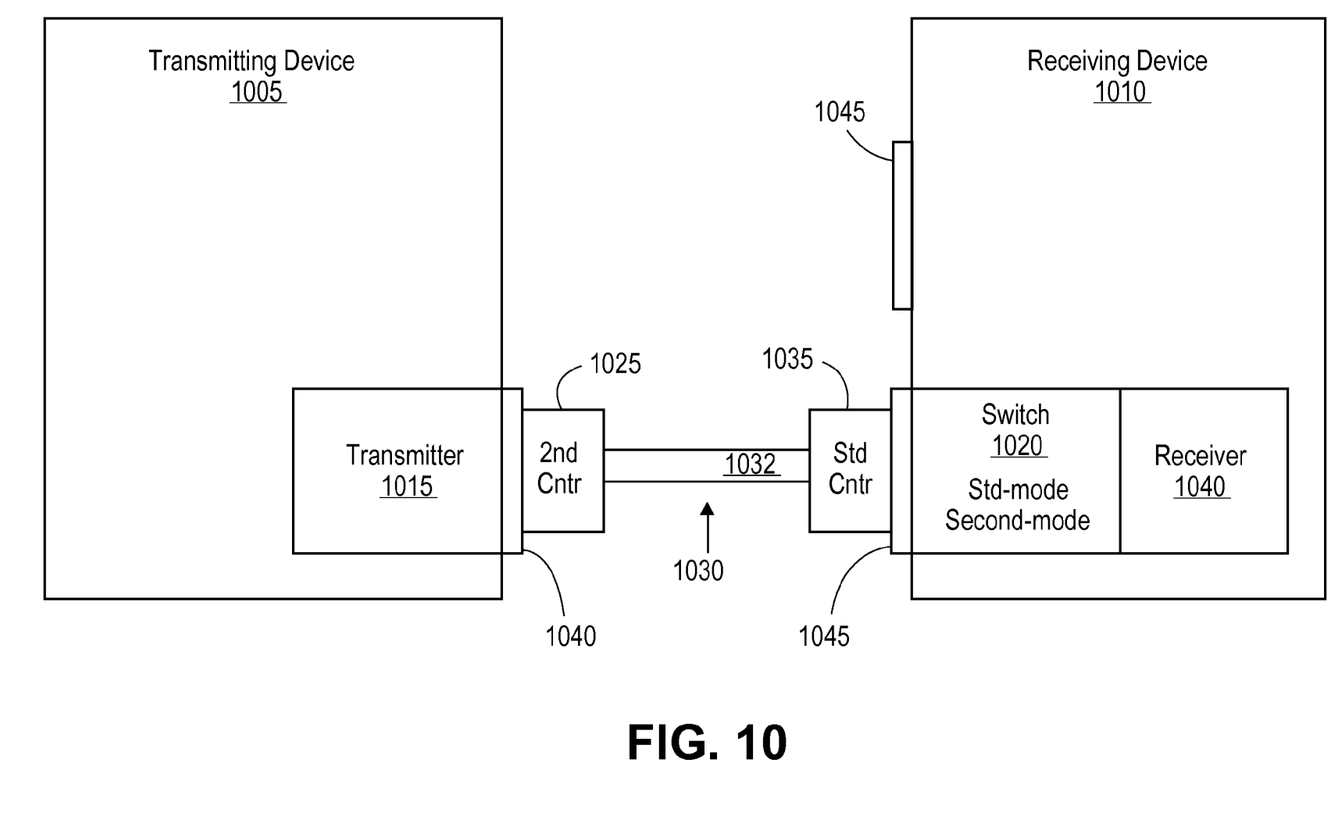
FIG. 10 is an illustration of an embodiment of a connection for a receiving device receiving data from a transmitting device.

FIG. 10 is an illustration of an embodiment of a connection for a receiving device receiving data from a transmitting device. In this illustration, the receiving device 1010, including a receiver 1040, and the transmitting device 1005, including a transmitter 1015, are connected together via a cable 1030. In some embodiments, the transmitting device 1005 and receiving device 1010 are at least portions of a system for the transfer of content data. The receiving device 1010 may be, for example, a presentation or rendering device, such as a television set or video monitor, which may include one or more communication sockets 1045, such as multiple HDMI sockets. The receiver 1040 may be, for example, an HDMI receiver. The receiving device 1010 further includes a switch 1020 to switch between a standard-mode for reception of data in a first mode (such as for HDMI data) and a second mode to receive alternative data, such as, for example, Ethernet data. The transmitting device 1005 may include a socket 1040 for a connector, which may include, for example, an HDMI connector or an Ethernet connector. In this illustration, the transmitting device 1005 and receiving device 1010 are connected via the cable 1030, the cable having a standard connector 1035, such as an HDMI connector, for connection with the receiving device 1010 and a cable section 1032 and second connector 1025 compatible with the communication protocol for the transmitting device 1005. In some embodiments, the receiving device 1010 will detect the relevant communication type when the receiving device 1010 is connected to the transmitting device 1005 via the cable 1030, and the switch 1020 will switch to the appropriate mode to map the pins of the socket 1045 as required for signal reception.

Figure 11:
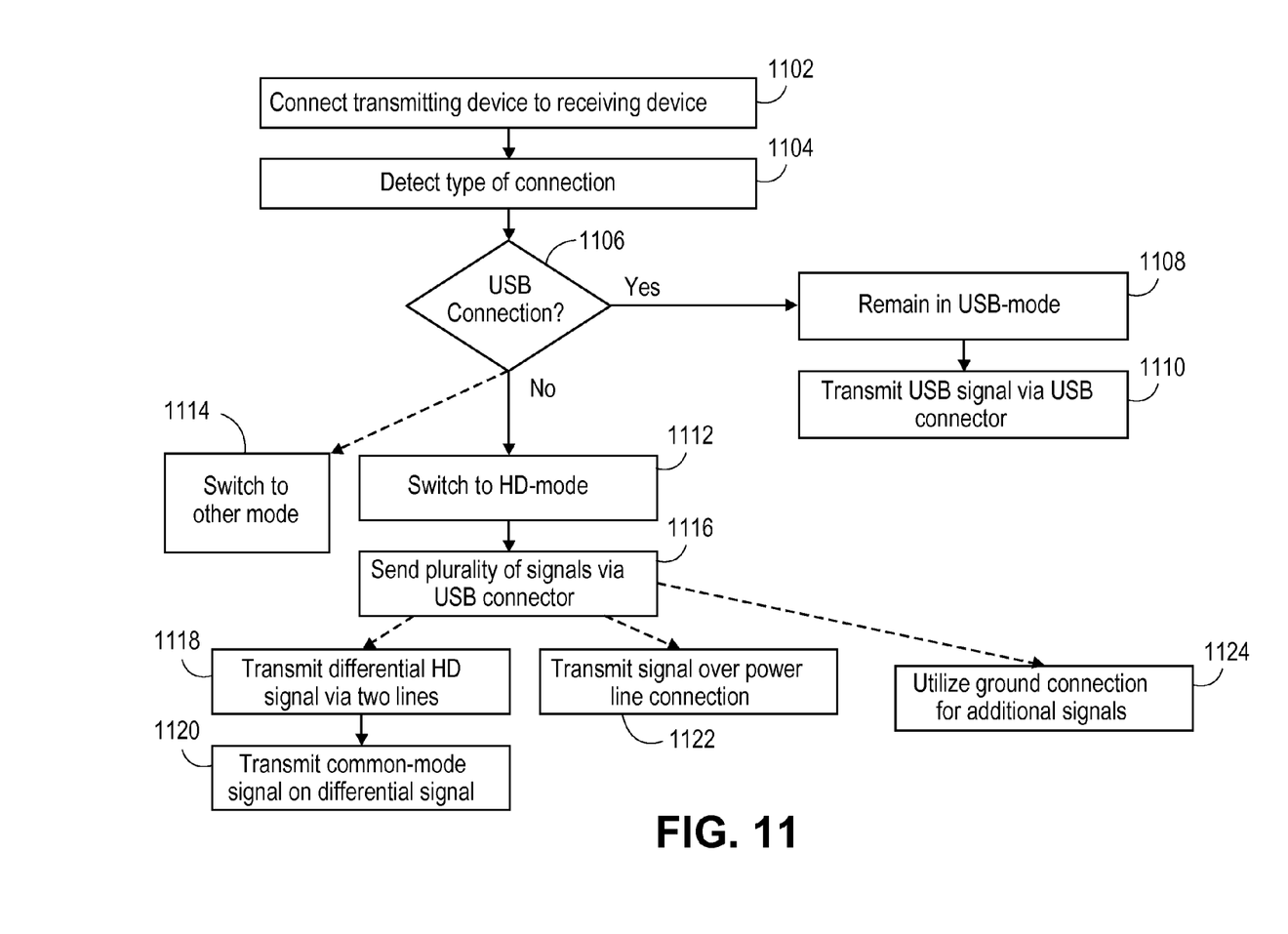
FIG. 11 is a flow chart illustrating an embodiment of a system for transmission of signals.

FIG. 11 is a flow chart illustrating an embodiment of a system for transmission of signals. In this illustration, a transmitting device is connected to a receiving device 1102 via a standard connector, such as a micro-USB connector. The transmitting device may detect the transmission protocol for the receiving device (or the receiving device may detect the transmission protocol for the transmitting device) 1104. If, for example, the connection is a USB connection 1106, the transmitting device may remain in a USB-mode 1108 (if, for example, the default mode is the USB-mode) and transmit a standard USB data signal via the micro-USB connector 1110. If not, the transmitting device may switch to HD-mode 1112, and transmit signals via the connector 1116 (or may switch to another relevant mode 1114). The transmission may include, for example, the transmission of a differential high-definition signal 1118, and possible transmission of a common mode signal on the differential signal 1120. The transmission may further include transmission of a signal, such as a clock or control signal, over a power connection of the connector 1122. The transmission may further include utilizing a ground connection of the connector to transmit additional signals 1124.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs which are not illustrated or described.

Various embodiments of the present invention may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments of the present invention may be provided as a computer program product, which may include a computer-readable medium having stored thereon computer program instructions, which may be used to program a computer (or other electronic devices) to perform a process according to the embodiments of the present invention. The machine-readable medium may include, but is not limited to, floppy diskettes, optical disks, compact disk read-only memory (CD-ROM), and magneto-optical disks, read-only memory (ROM), random access memory (RAM), erasable programmable read-only memory (EPROM), electrically-erasable programmable read-only memory (EEPROM), magnet or optical cards, flash memory, or other type of media/machine-readable medium suitable for storing electronic instructions. Moreover, the present invention may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the embodiments of the present invention is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example of the present invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the present invention, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

The invention claimed is:

1. A method for transmission of alternative content over standard connectors comprising:

connecting a first device to a second device utilizing a standard connector for a standard mode, the connector including a plurality of pins for the transfer of signals between the first device and the second device, the plurality of pins including a first pin for a power line, a second pin to identify the standard connector, a first data pin, a second data pin, and a ground pin;

detecting whether the second device is operating in the standard mode or an alternative mode, wherein the standard mode includes transmission of a first type of data according to a first protocol and the alternative mode includes transmission of a second type of data according to a second protocol, wherein the data for the second protocol includes a differential clock signal and a one-wire control signal;

upon detecting the second device is operating in the standard mode, transmitting or receiving data signals of the first type according to the first protocol via the plurality of pins of the standard connector; and upon detecting that the second device is operating in the alternative mode, switching one or more pins of the standard connector for the alternative mode and transmitting or receiving data signals of the second type according to the second protocol via the plurality of pins of the standard connector;

wherein the switching of the one or more pins of the standard connector for the alternative mode includes switching the second pin to transmit the control signal.

2. The method of claim 1, wherein the switching of the one or more pins of the standard connector for the alternative mode includes switching the first pin to modulate the power line to transit the clock signal in addition to operation as a power line.

3. The method of claim 1, wherein the signals for the alternative mode include a first differential data signal, the first differential data signal being transferred as a differential data signal using the first data pin and the second data pin.

4. The method of claim 3, wherein the signals for the alternative mode include a common mode signal transmitted on top of the first differential data signal.

5. The method of claim 4, wherein the common mode signal is the clock signal.

6. The method of claim 3, wherein the standard connector further includes a shell, wherein for the alternative mode the shell is used for ground and the ground pin of the connector is used for signal transmission, and a second signal is transferred via the second pin and the ground pin.

7. The method of claim 6, wherein the second signal is a second differential data signal.

8. The method of claim 7, wherein the signals include a second common mode signal transmitted on the second differential data signal.

9. The method of claim 8, wherein the second common mode signal is the control signal.

10. The method of claim 1, wherein switching the pins of the standard connector includes commanding an analog switch to switch lines connected to the standard connector to support the alternative mode.

11. The method of claim 1, further comprising switching to a third mode and switching the pins of the standard connector for the third mode.

12. The method of claim 1, wherein the standard mode is a USB (universal serial bus) mode.

13. The method of claim 12, wherein the alternative mode is a high-definition video mode.

14. An apparatus for transmission of alternative content over standard connectors comprising:
an interface for a standard connector for a standard mode, the apparatus to utilize the interface for a plurality of lines, wherein the apparatus is to detect a transmission mode of operation for a second apparatus connected to the apparatus via the interface, wherein the connector includes a plurality of pins for the transfer of signals, the plurality of pins including a first pin for a power line, a second pin to identify the standard connector, a first data pin, a second data pin, and a ground pin; and
a switch to switch the interface between a plurality of transmission modes, the plurality of transmission modes including the first standard mode and a second alternative mode, the switch to switch one or more connections for the plurality of lines to support the standard mode and the alternative mode, the apparatus to automatically switch to the alternative mode if the alternative mode is detected for the second apparatus;
wherein the standard mode includes transmission of a first type of data according to a first protocol and the alternative mode includes transmission of a second type of data according to a second protocol, wherein the data for the second protocol includes a differential clock signal and a one-wire control signal;
wherein the switching of the one or more pins of the standard connector for the alternative mode includes switching the second pin to transmit the control signal.

15. The apparatus of claim 14, further comprising a transmitter or receiver for transfer of a plurality of signals over the lines in at least one of the transmission modes.

16. The apparatus of claim 14, the switching of the one or more pins of the standard connector for the alternative mode includes switching the first pin to modulate the power line to transit the clock signal in addition to operation as a power line.

17. The apparatus of claim 14, wherein signals for the alternative mode includes a first signal to be transmitted over the first pin and the second pin, the first signal being a first differential data signal.

18. The apparatus of claim 17, wherein the signals for the alternative mode include a first common mode signal transmitted on top of the first differential data signal.

19. The apparatus of claim 18, wherein the first common mode signal is the clock signal.

20. The apparatus of claim 14, wherein the standard connector further comprises a shell, and wherein for the alternative mode the shell is to be utilized as a ground connection and the ground pin of the connector is used for signal transmission, a second signal to be transferred via the second pin and the ground pin.

21. The apparatus of claim 20, wherein the second signal is a second differential data signal.

22. The apparatus of claim 21, wherein a second common mode signal is transferred on the second differential data signal.

23. The apparatus of claim 22, wherein the second common mode signal is the control signal.

24. The apparatus of claim 14, wherein the standard connector is micro-USB (Universal Serial Bus) connector, and wherein the first standard mode is a USB mode.

25. The apparatus of claim 24, wherein the second alternative mode is a high definition mode, and wherein the apparatus is to transmit or receive high definition video content over the plurality of lines in the alternative mode.

26. A system for transmission of alternative content over standard connectors comprising:
a receiving device to receive data, the receiving device including a first socket for an interface, the interface including a plurality of lines; and
a transmitting device to transfer a plurality of signals to the receiving device, the transmitting device including a second socket to connect with the receiving device via the interface, wherein the first socket or the second socket is a standard socket for a first standard mode, the first or second socket including a plurality of pins for the transfer of signals, the plurality of pins including a first pin for a power line, the power line to provide power, battery charging current, or both in the standard mode, a second pin to identify the standard connector, a first data pin, a second data pin, and a ground pin;
wherein the receiving device, the transmitting device, or both the receiving device and the transmitting device include a switch to switch the interface between a plurality of transmission modes, the plurality of transmission modes including the first standard mode and a second alternative mode, the switch to switch one or more connections for the plurality of lines to support the standard mode and the alternative mode, the receiving device or transmitting device to automatically switch to the alternative mode if the alternative mode is detected for the other device;
wherein the standard mode includes transmission of a first type of data according to a first protocol and the alternative mode includes transmission of a second type of data according to a second protocol, wherein the data for the second protocol includes a differential clock signal and a one-wire control signal;
wherein the switching of the one or more connections for the alternative mode includes switching the second pin to transmit the control signal.

27. The system of claim 26, wherein the first data pin and the second data pin of the standard socket in the standard mode are re-purposed in the alternative mode for differential data signals and a common mode signal transmitted on top of the differential data signals.

28. The system of claim 27, wherein the common mode signal is the clock signal.

29. The system of claim 26, wherein the first pin of the standard socket is re-purposed for the transmission of the clock signal by modulating a power signal on the first pin to transit the clock signal in addition to operation as a power line.

30. The system of claim 26, wherein the standard socket includes a shell, and wherein for the alternative mode the second pin and the ground pin are re-purposed for transmission of a second differential signal applied to the second pin and the ground pin.

31. The system of claim 26, wherein the first socket is the standard socket, the first socket being a socket compatible with USB™(Universal Serial Bus) protocol.

32. The system of claim 26, further comprising a cable, the cable including a first connector compatible with the first socket and a second connector compatible with the second socket.

33. An apparatus for transmission of alternative content over standard connectors comprising
   a means for interfacing with a second apparatus over a plurality of lines using a standard connector for a standard mode, the connector includes a plurality of pins for the transfer of signals, the plurality of pins including a first pin for a power line, a second pin to identify the standard connector, a first data pin, a second data pin, and a ground pin;
   a means for detecting a transmission mode for the second apparatus, the transmission being one of a plurality of transmission modes including a first standard mode and a second alternative mode; and
   a means for automatically switching one or more connections for the plurality of lines to support the first mode and the second mode based on the detected transmission mode for the second apparatus;
   wherein the standard mode includes transmission of a first type of data according to a first protocol and the alternative mode includes transmission of a second type of data according to a second protocol, wherein the data for the second protocol includes a differential clock signal and a one-wire control signal;
   wherein the switching of the one or more pins of the standard connector for the alternative mode includes switching the second pin to transmit the control signal using the second pin.

34. The apparatus of claim 33, wherein the apparatus maintains electrical and logical compliance for the first standard mode.

* * * * *

UNITED STATES PATENT AND TRADEMARK OFFICE
CERTIFICATE OF CORRECTION

Page 1 of 1

PATENT NO. : 8,176,214 B2
APPLICATION NO. : 12/606096
DATED : May 8, 2012
INVENTOR(S) : Graeme Peter Jones et al.

It is certified that error appears in the above-identified patent and that said Letters Patent is hereby corrected as shown below:

Title Page, Item (75), line 4, replace "Gyadong Kim" with -- Gyudong Kim --.

Signed and Sealed this
Seventeenth Day of June, 2014

Michelle K. Lee
*Deputy Director of the United States Patent and Trademark Office*